United States Patent [19]

Douglas et al.

[11] Patent Number: 4,584,185

[45] Date of Patent: Apr. 22, 1986

[54] RECOVERY OF TUNGSTEN AND RHENIUM

[75] Inventors: Alan D. Douglas; Kenneth T. Reilly, both of Towanda, Pa.

[73] Assignee: GTE Products Corporation, Stamford, Conn.

[21] Appl. No.: 768,252

[22] Filed: Aug. 22, 1985

[51] Int. Cl.$^4$ ..................... C01G 41/00; C01G 47/00
[52] U.S. Cl. ........................................ 423/49; 423/55; 423/50
[58] Field of Search ............................. 423/49, 50, 55

[56] References Cited

U.S. PATENT DOCUMENTS 1,804,429  5/1937  Noddack et al. ..................... 423/50
2,316,583  4/1943  Highrites et al. ..................... 423/55

Primary Examiner—Herbert T. Carter

Attorney, Agent, or Firm—Donald R. Castle; L. Rita Quatrini

[57] ABSTRACT

A process is disclosed for recovering tungsten and rhenium from a tungsten and rhenium bearing solution. The process involves adding sufficient hydrochloric acid to the solution to form a first precipitate containing essentially all of the tungsten and a first mother liquor having an acid concentration of at least about 1.25 normal, and containing the major portion the rhenium, followed by separating the first precipitate from the first mother liquor. A source of sulfide ions is then added to the first mother liquor with agitation for a sufficient time and with the amount of sulfide ions being sufficient to form a second precipitate containing essentially all of the rhenium which was in the first mother liquor, and a second mother liquor, followed by separation of the second precipitate from the second mother liquor.

5 Claims, No Drawings

RECOVERY OF TUNGSTEN AND RHENIUM

BACKGROUND OF THE INVENTION

This invention relates to a process for recovering tungsten and rhenium from a tungsten and rhenium bearing solution. More particularly, it relates to a process for recovering tungsten and rhenium from a tungsten and rhenium bearing solution by first precipitating the tungsten from acid solution followed by precipitation of the rhenium as a sulfide from acid solution.

The manufacture of tungsten-rhenium alloy wire unavoidably results in the production of alloy scrap which may be in the form of powder, ingots, rod or wire.

It is desirable to recover the tungsten and rhenium from the scrap for economic reasons.

It has been the practice to process the scrap to produce an alkali tungstate and perrhenate solution by well known methods. The alkali solution is then subjected to known processes which involve techniques as precipitation, ion exchange, etc. to separate and recover the tungsten and rhenium. The processes generally involve evaporation of large quantities of water, the disadvantagae, therefore, being the high energy requirements and the large amount of labor and processing time required to handle large quantities of waste products which must be disposed of.

Therefore, a process to recover the tungsten and rhenium without the above disadvantages would be desirable.

SUMMARY OF THE INVENTION

In accordance with one aspect of this invention, there is provided a process for recovering tungsten and rhenium from a tungsten and rhenium bearing solution. The process involves adding sufficient hydrochloric acid to the solution to form a first precipitate containing essentially all of the tungsten and a first mother liquor having an acid concentration of at least about 1.25 normal, and containing the major portion the rhenium, followed by separating the first precipitate from the first mother liquor. A source of sulfide ions is then added to the first mother liquor with agitation for a sufficient time and with the amount of sulfide ions being sufficient to form a second precipitate containing esentially all of the rhenium which was in the first mother liquor, and a second mother liquor, followed by separation of the second precipitate from the second mother liquor.

DETAILED DESCRIPTION OF THE INVENTION

For a better understanding of the present invention, together with other and further objects, advantages, and capabilities thereof, reference is made to the following disclosure and appended claims in connection with the above description of some of the aspects of the invention.

The starting tungsten and rhenium bearing solution can be any type of soluton. The soluton is typically derived from an alkali fusion of tungsten-rhenium material to form a fusion cake which is leached with water to solubilize the tungsten and rhenium values and form an alkali tungstate-perrhenate soluton. The concentration of the solution is typically about 150 g W/l and about 4.5 g Re/l.

To the solution is added sufficient hydrochloric acid to form a first precipitate whch is essentially tungstic acid containing essentially all of the tungsten and a first mother liquor having an acid concentration of at least about 1.25 normal, and preferably from about 1.25 normal to about 1.5 normal. The first mother liquor contains the major portion of the rhenium.

The first precipitate is then separated from the first mother liquor by any standard technique such as filtration.

The first precipitate can be water washed to remove soluble impurities as chlorides.

It is desirable to use enough hydrochloric acid to convert essentially all of the tungsten to tungstic acid. In determining the amount of hydrochloric acid to be used, the controlling factor is the hydrochloric acid concentration of the first mother liquor after essentially all of the tungsten is precipitated. The hydrochloric acid concentration of the first mother liquor must be at least about 1.25 normal. This acid concentration is necessary to produce a tungstic acid first precpitate having a particle size large enough to settle and filter well so that the processing steps required for separation and water washing can be done in a relatively short period of time.

A source of sulfide ions is then added to the first mother liquor, with agitation for a sufficient time and with the amount of sulfide ions being sufficient to form a second precipitate which is essentially rhenium heptasulfide containing essentially all of the rhenium which was in the first mother liquor, and a second mother liquor. The source of sulfide ions can be sodium hydrosulfide, sodium sulfide, sodium thiosulfide, ammonium sulfide, and hydrogen sulfide, with the preferred source being sodium hydrosulfide.

It has been found that when the first mother liquor is at least about 1.25 normal in hydrochloric acid, the precipitation of the rhenium heptasulfide is efficient. This compound will neither form nor precipitate in an alkaline medium upon addition of the sulfide ions. Instead, thioperrhenates are produced, such as $NaReS_4$ and $NaReO_3S$, which are water soluble. The presence of acid decomposes the thioperrhenates to produce rhenium heptasulfide which is insoluble in water and in hydrochloric acid. The complete conversion to the rhenium heptasulfide on addition of the sulfide ions generally takes time, usually about 4 hours, if at ambient temperature. This time can be decreased by increasing the hydrochloric acid concentration up to about 4 normal, or by heating. Boiling for about 2 hours or longer is necessary when sodium thiosulfate is the sulfide ion source. Heating is unnecessary to obtain complete precipitation of rhenium as the heptasulfide when sodiium hydrosulfide is used as the sulfide ion source. The sodium hydrosulfide can be added to the first mother liquor in either solid form or as an aqueous solution. It has also been found that the time of conversion to rhenium heptasulfide can be shortened by using about a 200% excess of sodium hydrosulfide above that which is theoretically required to form rhenium heptasulfide and insoluble sulfides of other contaminants.

To avoid a strong odor of hydrogen sulfide, the sodiun hydrosulfide is added slowly preferably at ambient temperature to the first mother liquor while it is being agitated in a vessel which is equipped with an exhaust system, or else is a completely enclosed pressure vessel. Hydrogen sulfide is generated instantaneously when the sodium hydrosulfide contacts the acidic first mother liquor and some of the gas is released into the air space above the liquor. The release of hydrogrn sulfide at the surface when solid sodium hydrosulfide is used is probably minimized by keeping the system at ambient temperature, since the solubility of gases in liquids decreases at elevated temperatures. If a solution of sodium hydrosulfide is used, more efficient utilization of the same can be attained by introducing it under the surface of the mother liquor by pumping it through a submerged feed pipe.

After the addition of the sulfide ion source has been completed, agitation is continued for preferably from about 30 to about 60 minutes and then stopped. The batch is then allowed to stand for from about 4 to about 24 hours. The completeness of precipitation of rhenium heptasulfide can be checked by obtaining a representative sample, filtering the sample, and testing the filtrate by any available analysis metod. Typically when the filtrate contains less than about 0.01 g Re/l the precipitation is considered to be complete.

When the precipitation is complete the precipitate of rhenium heptasulfide is separated from the resulting second mother liquor by any standard technique but typically by filtering through a highly retentive paper to give a very clear filtrate.

The $Re_2S_7$ pecipitate can be washed with pure water to remove soluble impurities such as chlorides, etc.

To more fully illustrate this invention, the following non-limiting examples are presented.

EXAMPLE 1

Tungstic acid is precipitated from a hydrochloric acid tungsten-rhenium solution. The resulting mother liquor is about 1.45 normal in hydrochloric acid and contains about 2.0 g Re/l. To about 1,795 gallons of the mother liquor is added about 115 pounds of NaSH. This is about 200% in excess of the theoretical required to convert essentially all of the rhenium and other components present to sulfides. The addition of the NaSH is done slowly with agitation at ambient temperature over about a 30 minute period. The resulting NaSH-treated solution is allowed to agitate for an additional hour and then allowed to stand for about 22 hours. The resulting mother liquor contains less than about 0.01 g Re/l. The $Re_2S_7$ precipitate is then filtered off and collected.

EXAMPLE 2

Tungstic acid is precipitated from a hydrochloric acid tungsten-rhenium solution. The resulting mother liquor is about 1.25 normal in hydrochloric acid and contains about 2.7 g Re/l. To about 2,666 gallons of the mother liquor is added about 281 pounds of NaSH. This is about 200% in excess of the theoretical required to convert essentially all of the rhenium and other components present to sulfides. About $5\frac{1}{2}$ hours after the NaSH is added, a sample is obtained of the mother liquor. The sample contains less than about 0.01 g Re/l. The $Re_2S_7$ precipitate is then filtered off and collected.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for recovering tungsten and rhenium from a alkali tungstate and perrhenate bearing solution, said process comprising:
    (a) adding sufficient hydrochloric acid to said solution to form a first precipitate containing essentially all of the tungsten as tungstic acid and a first mother liquor having an acid concentration of at least about 1.25 normal, said first mother liquor containing the major portion of the rhenium;
    (b) separating said first precpitate from said first mother liquor;
    (c) adding a source of sulfide ions to said first mother liquor, with agitation for a sufficient time and with the amount of said sulfide ions being sufficient to form a second precipitate containing essentially all of the rhenium as rhenium heptasulfide which was in said first mother liquor, and a second mother liquor; and
    (d) separating said second precipitate from said second mother liquor.

2. A process of claim 1 wherein the hydrochloric acid concentration is from about 1.25 normal to about 1.5 normal.

3. A process of claim 1 wherein the source of sulfide ions is selected from the group consisting of sodium hydrosulfide, sodium sulfide, sodium thiosulfade, ammonium sulfide, and hydrogen sulfide.

4. A process of claim 3 wherein said source of sulfide ions is sodium hydrosulfide.

5. A process of claim 1 wherein said sulfide ions are added to said first mother liquor in an amount equal to at least about 200% in excess of the theoretical required to form sulfides with the rhenium and with any contaminants contained therein.

* * * * *